United States Patent
Evans et al.

(10) Patent No.: US 10,475,240 B2
(45) Date of Patent: Nov. 12, 2019

(54) SYSTEM, METHOD, AND APPARATUS TO DISPLAY THREE-DIMENSIONAL ROBOTIC WORKCELL DATA

(75) Inventors: Judy A. Evans, Oakland, MI (US); Kenneth W. Krause, Rochester Hills, MI (US)

(73) Assignee: FANUC ROBOTICS AMERICA CORPORATION, Rochester Hills, MI (US)

( * ) Notice: Subject to any disclaimer, the term of this patent is extended or adjusted under 35 U.S.C. 154(b) by 0 days.

(21) Appl. No.: 13/285,455

(22) Filed: Oct. 31, 2011

(65) Prior Publication Data

US 2012/0127165 A1  May 24, 2012

Related U.S. Application Data

(60) Provisional application No. 61/415,594, filed on Nov. 19, 2010.

(51) Int. Cl.
| | | |
|---|---|---|
| *G06T 19/00* | (2011.01) | |
| *G05B 19/418* | (2006.01) | |
| *B25J 9/16* | (2006.01) | |

(52) U.S. Cl.
CPC .............. *G06T 19/00* (2013.01); *B25J 9/1671* (2013.01); *G05B 19/41885* (2013.01); *G05B 2219/31472* (2013.01); *G05B 2219/32341* (2013.01); *Y02P 90/26* (2015.11)

(58) Field of Classification Search
CPC ...... G06F 21/60; G06F 2217/04; G06F 17/50; G06F 17/5009; A61B 19/2203; A61B 17/3403; A61B 19/2223; A61B 2019/502; H04M 11/00; H04M 11/007; G05B 19/409; G05B 19/41885; G05B 19/41805; G05B 2219/31064; G05B 2219/39449; G06T 19/00; B25J 9/1605; G06K 2209/40; G09F 9/00; G09B 19/24; G09B 5/00; G09B 5/02; G09B 5/065; H04L 29/06034
USPC ........................................................ 345/419
See application file for complete search history.

(56) References Cited

U.S. PATENT DOCUMENTS

| | | | |
|---|---|---|---|
| 6,167,328 A * | 12/2000 | Takaoka | B25J 9/1671 |
| | | | 318/568.1 |
| 6,175,206 B1 | 1/2001 | Ueno et al. | |
| 6,518,980 B1 | 2/2003 | DeMotte et al. | |
| 6,560,513 B2 * | 5/2003 | Krause | B25J 9/1656 |
| | | | 219/124.34 |
| 6,944,584 B1 | 9/2005 | Tenney et al. | |
| 2005/0285854 A1 | 12/2005 | Morita et al. | |

(Continued)

FOREIGN PATENT DOCUMENTS

| | | |
|---|---|---|
| JP | H0542446 A | 2/1993 |
| JP | 2002180665 A | 6/2002 |

(Continued)

*Primary Examiner* — Kimbinh T Nguyen
(74) *Attorney, Agent, or Firm* — William J. Clemens; John A. Miller; Shumaker, Loop & Kendrick, LLP (57) ABSTRACT

A system and a method for displaying a three-dimensional robotic workcell data includes generating the robotic workcell data, a display device including a web browser for receiving the robotic workcell data in a standard format and displaying a three-dimensional rendering of the robotic workcell data, and manipulating the three-dimensional rendering on the display device.

18 Claims, 6 Drawing Sheets

(56) References Cited

U.S. PATENT DOCUMENTS

| | | | |
|---|---|---|---|
| 2006/0072809 A1* | 4/2006 | Hashimoto | B25J 9/1697 |
| | | | 382/153 |
| 2006/0181527 A1 | 8/2006 | England et al. | |
| 2006/0241792 A1 | 10/2006 | Pretlove | |
| 2007/0108109 A1 | 5/2007 | Erlandsson-Warvelin et al. | |
| 2007/0167702 A1 | 7/2007 | Hasser et al. | |
| 2009/0125146 A1 | 5/2009 | Zhang et al. | |
| 2009/0204257 A1 | 8/2009 | Landsnes | |
| 2010/0092032 A1 | 4/2010 | Boca | |
| 2010/0211204 A1 | 8/2010 | Zhang et al. | |
| 2012/0215354 A1* | 8/2012 | Krasny | B25J 9/1666 |
| | | | 700/255 |
| 2014/0042136 A1* | 2/2014 | Daniel et al. | 219/130.5 |

FOREIGN PATENT DOCUMENTS

| | | | |
|---|---|---|---|
| JP | 2002361580 A | 12/2002 | |
| JP | 2003053688 A | 2/2003 | |
| JP | 2003323636 A | 11/2003 | |
| JP | 2004362408 A | 12/2004 | |
| JP | 2005084753 A | 3/2005 | |

* cited by examiner

SYSTEM, METHOD, AND APPARATUS TO DISPLAY THREE-DIMENSIONAL ROBOTIC WORKCELL DATA

CROSS-REFERENCE TO RELATED APPLICATION

This application claims the benefit of U.S. provisional patent application Ser. No. 61/415,594 filed Nov. 19, 2010.

FIELD OF THE INVENTION

The present invention relates generally to robotics. More particularly, the invention is directed to a system, a method, and an apparatus for displaying three-dimensional graphical data in a robotic environment.

BACKGROUND OF THE INVENTION

Currently, a high powered personal computer is required to render a three-dimensional workcell data as a three-dimensional image. Additionally, a customized programming code (e.g. C programming language) is required for each display device. Accordingly, to enable a particular device (e.g. computer) to display the three-dimensional image of a workcell, the particular device must include a customized software program.

Typically, an operator of a robot is required to access a dedicated computer to be able to visualize Dual Check Safety (DCS) zones and interference. Presently, a three-dimensional image representing a robot workcell cannot be readily viewed by a user on a personal electronic device such as a cell phone, an iPad by Apple, Inc., or other browser-enabled devices. Therefore, the three-dimensional image of the workcell is not readily available in the hands of an operator of a robot.

The prior art also requires a programmer/operator understand esoteric math concepts such as how a specific angle relates to an angle of robotic tooling and to other elements in three space. For a physical position the operator can see the physical machine and program a point according to the physical positions. However there are more virtual special relationships which the operator cannot see in the prior art. Elements such as safety walls, the robot envelope, areas where robots overlap operating zones for particular operations are difficult to visualize without a three dimensional model. The operator must be very experienced in order to relate the text describing these elements to the physical world.

The prior art for jogging a robot requires an experienced operator who knows how the jog buttons map to the physical world. The operator is typically required to mentally visualize a resultant outcome in response to engaging a particular key. However, even an experienced operator occasionally engages an undesired key, which can result in damage to the robot and surrounding equipment. For specific applications such as arc welding, the operator must be familiar with specific terms such as lead and lag angle, which are not obvious from the textual information traditionally provided.

Shortcomings of prior art:
1. conventional two dimensional representations of the workcell are primitive and may not be well understood by the user attempting to deal with a three dimensional workcell environment;
2. an operator of a robot is required to access a computer that is remote from the workcell;
3. the operator does not have portable access to a three-dimensional representation of the workcell (e.g. the operator does not have a portable visual (point cloud) representation of a robot program); and
4. no standardized programming code for browser-enabled devices.

SUMMARY OF THE INVENTION

Concordant and consistent with the present invention, a system and a method for displaying a three dimensional representation of a three dimensional graphical data in a robotic environment overcomes the shortcomings of the prior art as follows.

The system and method of the present invention provide a means to display a representation of a three-dimensional workcell data on various portable hand-held devices. Accordingly, the three-dimensional workcell data can be utilized by any user having a compatible, browser-enabled handheld device. Therefore, a user can have access to reliable three-dimensional displays as an aid to teaching and maintaining a robot.

In one embodiment, a system for displaying a three-dimensional workcell data comprises: a means for generating the workcell data; a display device including a web browser for receiving the workcell data in a standard format and displaying a three-dimensional rendering of the workcell data; and a means for manipulating the three-dimensional rendering on the display device.

In another embodiment, an apparatus for displaying a three-dimensional workcell data comprises: a processor for operating the apparatus; a display coupled to the processor; and a web browser running on the apparatus for receiving a workcell data in a standard format and for displaying the workcell data on the display, wherein the apparatus acts as a client to display the workcell data as a three-dimensional rendering.

The invention also includes methods for displaying a three-dimensional workcell data.
One method comprises the steps of:
a) providing the workcell data;
b) providing a display device including a web browser;
c) communicating the workcell data to the display device;
d) displaying a visual output with the web browser of the display device, the visual output representing a three-dimensional rendering of the workcell data; and
e) manipulating the visual output.

BRIEF DESCRIPTION OF THE DRAWINGS

The above, as well as other advantages of the present invention, will become readily apparent to those skilled in the art from the following detailed description of the preferred embodiment when considered in the light of the accompanying drawing in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
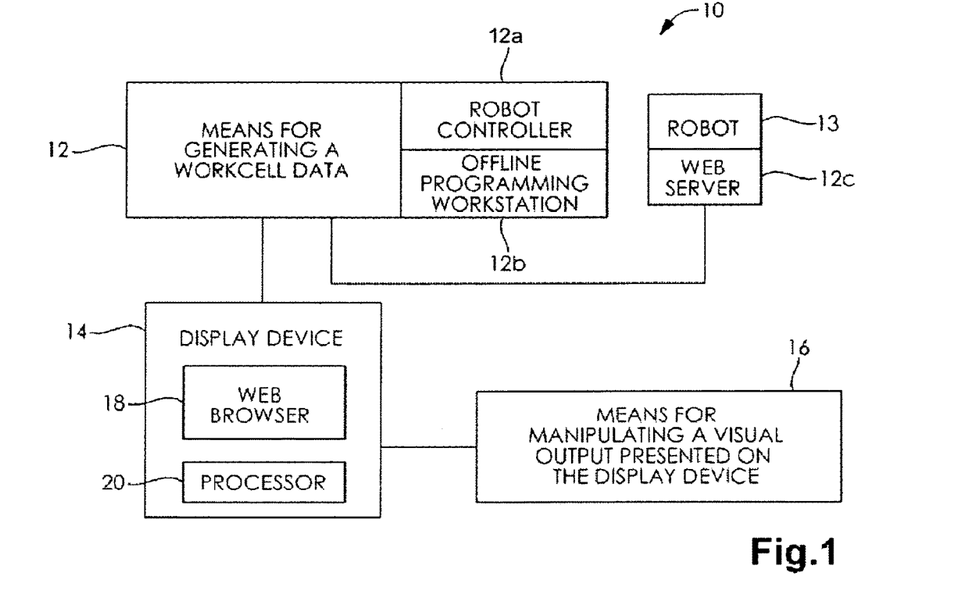
FIG. 1 is a schematic block diagram of a system for displaying a workcell data according to an embodiment of the present invention.

FIG. 1 illustrates a system 10 for displaying a three-dimensional robotic workcell data according to an embodiment of the present invention. As shown, system 10 includes a means for generating 12 a workcell data, a display device 14 for receiving the workcell data and displaying a visual output representing the workcell data, and a means for manipulating 16 the visual output.

As a non-limiting example, the means for generating 12 a workcell data includes at least one of a robot controller 12a and an offline programming workstation 12b. It is understood that other sources of the workcell data can be used. As a further non-limiting example, a web server 12c is disposed on a robot 13 to communicate the workcell data to the display device 14 (e.g. via the Internet or network connection). It is further understood that the web server 12c can be disposed remotely from the robot 13.

In certain embodiments, the workcell data is a full three-dimensional data (e.g. "full 3D", wherein the display device 14 has full real-time three-dimensional display capability). As a non-limiting example, the workcell data represents at least one of a three-dimensional robot model, an animated three-dimensional robot model, virtual safety zones, robot interference zones, and a vision setup data. Other data and structure can be represented by the workcell data such as a model of a machine, a model of a tooling (e.g. end of arm tooling), a model of virtual walls, a model of the machine workspace, a positional sequence data, a model of a spot welding gun, a model of an arc welding torch, a model of a paint gun and fan spray, work pieces, physical safety fences, and other machines, for example. However, it is understood that the workcell data can represent any physical structure or virtual representation.

The system 10 typically includes a standard web technology to communicate the workcell data to the display device 14. For example, the workcell data is typically transmitted in accordance with the HTML5 specification (e.g. Canvas, WebGL, SVG, and the like). Accordingly, the display device 14 can receive the workcell data and present a visual representation (e.g. visual output) of the workcell data without a customized local programming code. It is understood that the workcell data can be communicated to the display device 14 using any standard web communication technology such as a wired Ethernet, a wireless Ethernet, Bluetooth protocol, a cellular network, and a wired serial connection, for example. Other means of communicating the workcell data can be used such as the system and methods described in U.S. Pat. No. 6,518,980, hereby incorporated herein by reference in its entirety).

In certain embodiments, the display device 14 includes a dynamic display (not shown), wherein a visual output of three-dimensional elements can be manipulated in three-dimensional space. As a non-limiting example, the display device 14 includes fully animated robot link updates. As a further non-limiting example, the display device 14 provides a visual output including at least one of robot program paths, robot work envelopes, interference zones, and safety walls. Other visual outputs can be presented on the display device 14.

In certain embodiments, the display device 14 includes a web browser 18 for receiving the workcell data in a standard format. However, other means (e.g. software, platforms, and the like) can be used to receive the workcell data in any format and display the data on the display device 14. It is understood that the display device 14 can be one of a browser-enabled teach pendant, a browser-enabled cell phone, a browser enabled portable computer (e.g. tablet or other personal computer). It is further understood that any device can be used to access and display a representation of the workcell data. In certain embodiments, the display device 14 can include safety switches and an enabling device similar to a robotic teach pendant, as appreciated by one skilled in the art. In certain embodiments, the display device 14 can include components similar to the teach pendant described in U.S. Pat. No. 6,560,513, hereby incorporated herein by reference in its entirety). As a non-limiting example, the display device 14 can include a processor 20 capable of operating the display device 14 and any components (e.g. display screen, the web browser 18, and I/O devices) of the display device 14.

The means for manipulating 16 the visual output (e.g. three-dimensional rendering) on the display device 14 typically includes controls (e.g. touch screen, joystick, mouse, trackball, accelerometer, and the like) to at least one of modify a position of the robot, modify the programmed path, program a robot, coordinate robots, modify a viewpoint, program arc welding, program spot welding, program a picking operation, and program a sealing operation.

Figure 2:
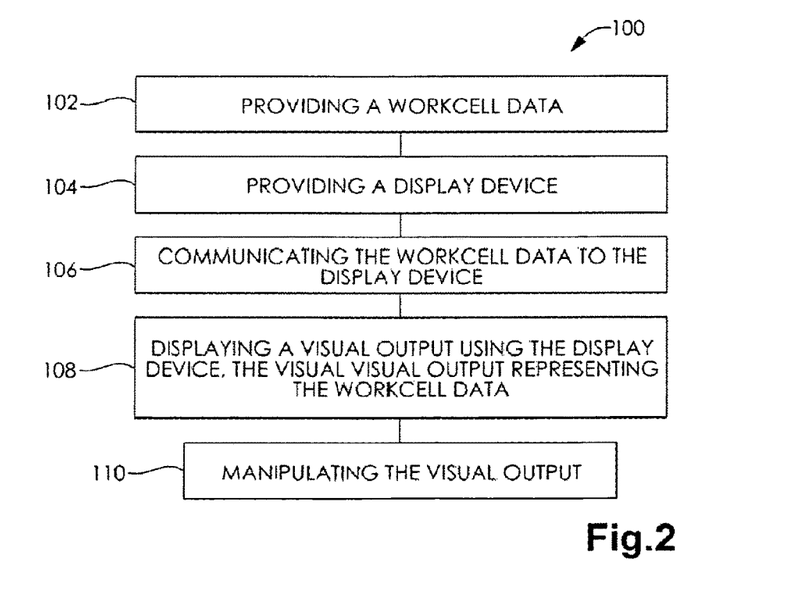
FIG. 2 is a schematic flow diagram of a method for displaying a workcell data according to an embodiment of the present invention.

FIG. 2 illustrates a method 100 for displaying a three-dimensional workcell data (e.g. a three dimensional rendering of a workcell data). In a step 102, the workcell data is provided. Models of a machine (e.g. robot) and associated components can be downloaded from the machine using a communications protocol where the machine acts as a server and a hand-held device (e.g. the display device 14) acts as a client to the server. One example of such a relationship is the web browser 18 and a web server.

In a step 104, the display device 14 is provided and is in data communication with the source of the workcell data.

In a step 106, the workcell data is communicated to the display device 14. As a non-limiting example, the workcell data is communicated using an HTTP standard. It is understood that utilizing such a common, standard, and pervasive protocol as HTTP allows a variety of connections to a number of servers to retrieve additional information thereby allowing a common handheld device (e.g. the display device 14) to interface to a number of different machines. It is further understood that the HTTP protocol is evolving to encompass three-dimensional concepts in a general purpose way (e.g. WebGL). Accordingly, any machine which follows the standard can be displayed on the handheld device using a generic means.

In a step 108, the display device 14 presents a visual representation (i.e. visual output) of the workcell data using the web browser 18. As a non-limiting example, the display device 14 allows a user to preview a movement of the machine graphically by engaging the means for manipulating 16 (e.g. pressing a movement key), wherein the display device 14 displays the movement graphically before actually moving the mechanism. As a further non-limiting example, the visual output presented on the display device 14 can be configured to indicate a collision object (e.g. safety wall) and to project a collision of the physical robot with the collision object, prior to executing a movement.

In a step 110, the visual output presented by the display device 14 is manipulated. In certain embodiments, a user can select visual points singularly or as a group, wherein the visual points can be related to a programmed sequence. As a non-limiting example, the user can move and configure the visual points in a three-dimensional space. As a further non-limiting example, the user can rotate, zoom, tilt, and pan a particular view. It is understood that the user can manipulate the visual output in any manner available through the underlying software.

In certain embodiments, a method for programming and operating a robot includes utilizing a three-dimensional display of workcell data on a traditional teaching device. Accordingly, an operator can perform all of the functions required to program the robot such as jogging and operating associated hardware from the traditional teaching device that is also equipped to present the three-dimensional display. It is understood that the teaching device can include safety interlocks to provide safe operation of the actual robot while visualizing and manipulating the three-dimensional data on the same device. It is further understood that the teaching device would typically be a teach pendant dedicated to the teaching and operation of that specific robot.

Figure 3:
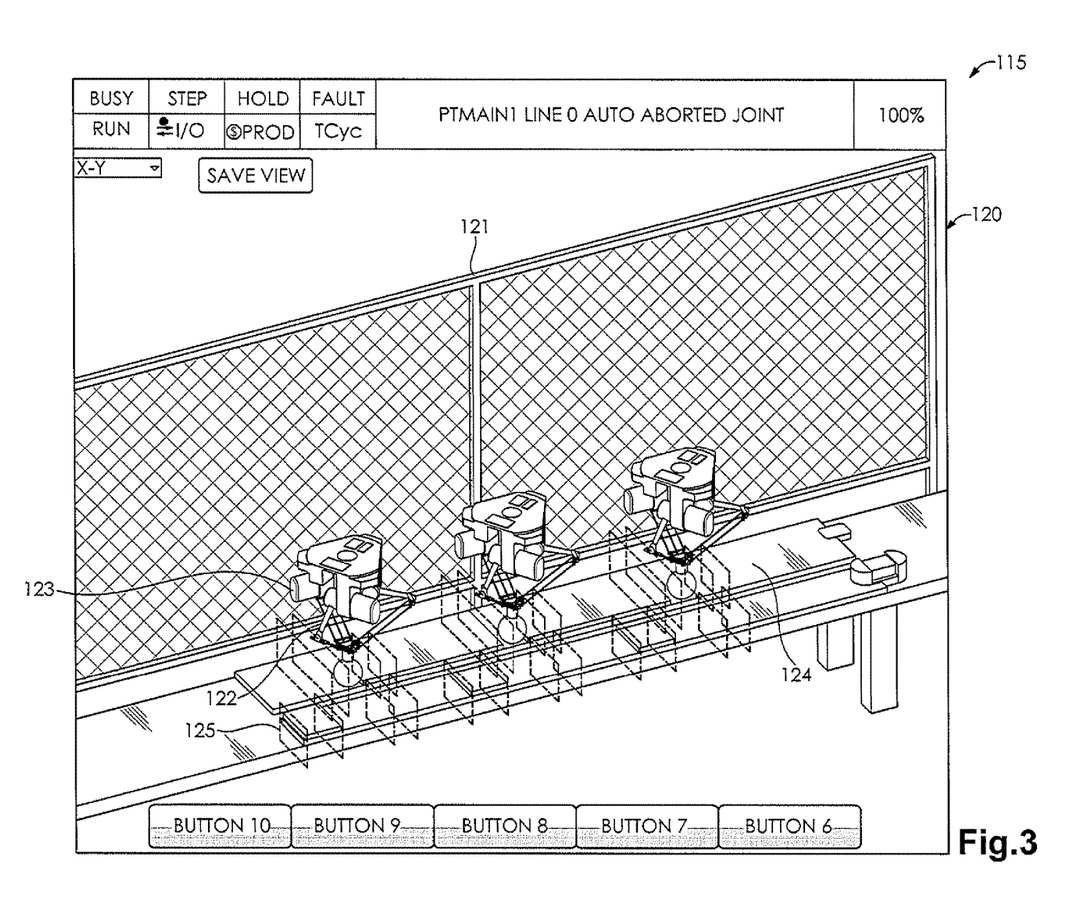
FIGS. 3-7 are example screen shots of a visual output presented on a display device of the system of FIG. 1.

As an illustrative example, FIGS. 3-7 show an embodiment of the system 10 and the method 100 in operation. Specifically, FIG. 3 illustrates a three-dimensional visual output 120 of a robotic workcell in a conveyor environment as a screen display 115. In certain embodiments, a user can interact with the visual output 120 to manipulate the visual output. As a further non-limiting example, various components represented by the visual output 120 can be individually selected by a user (e.g. a fence 121, a robot 122, robot support fixtures 123, a load balance group 124, conveyor stations 125 (i.e. Vistrack work area), sensors (camera, etc.), and other conveyor components.

Figure 4:
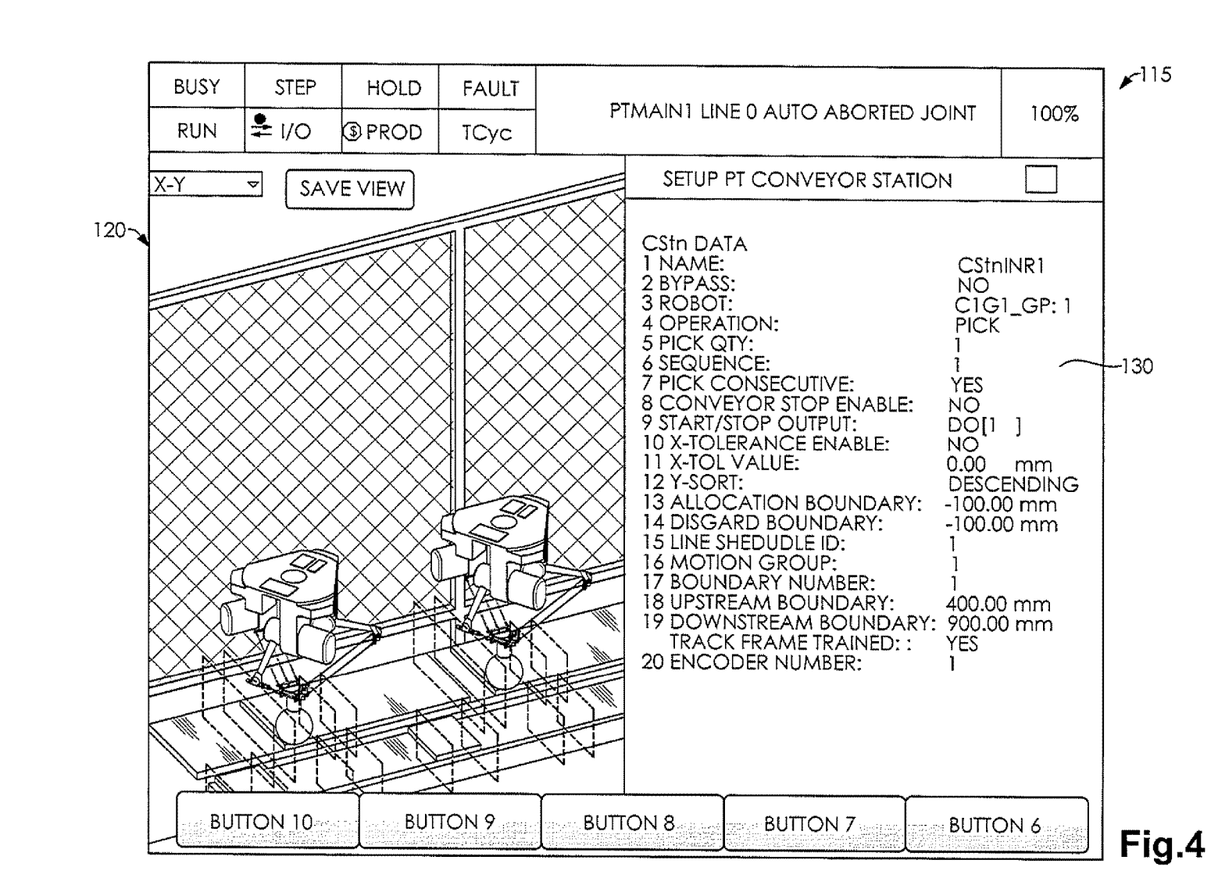

In certain embodiments, once a particular object is selected by a user, a pop-up screen 130 can appear, as shown in FIG. 4. For example, when a user selects a conveyor station, a set-up screen can be presented as the pop-up screen 130 on the display device 14 to allow the user to view and configure settings associated with the selected conveyor station. It is understood that any method can be used to trigger a selection (e.g. double click) of any objected presented on the visual output 120 of the display device 14.

Figure 5:
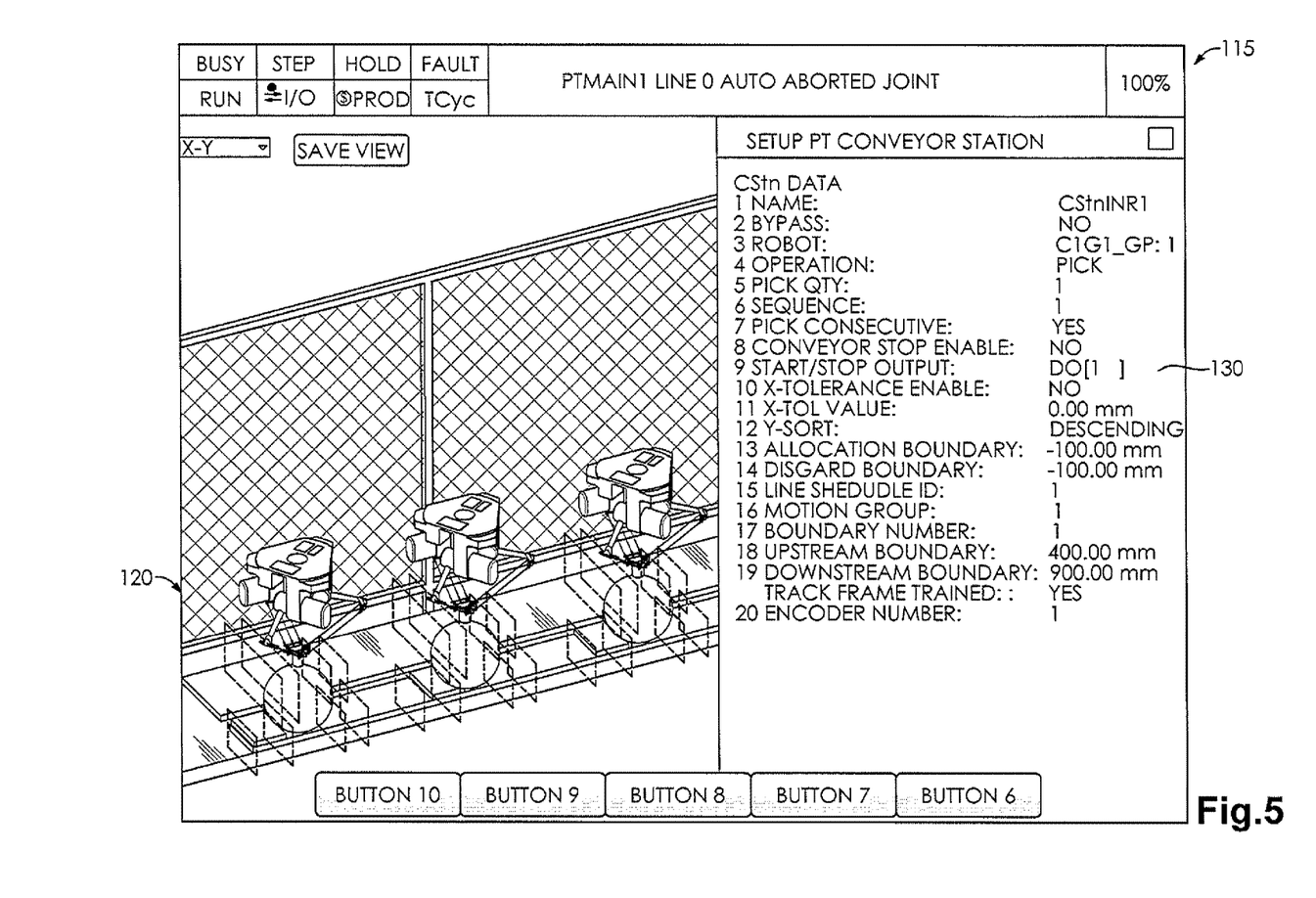

In certain embodiments, a user can select a particular menu item for configuring the components in the workcell environment. Accordingly, once a menu item is selected, the visual output 120 can be automatically resized to provide an appropriate view of the components, as shown in FIG. 5.

Figure 6:
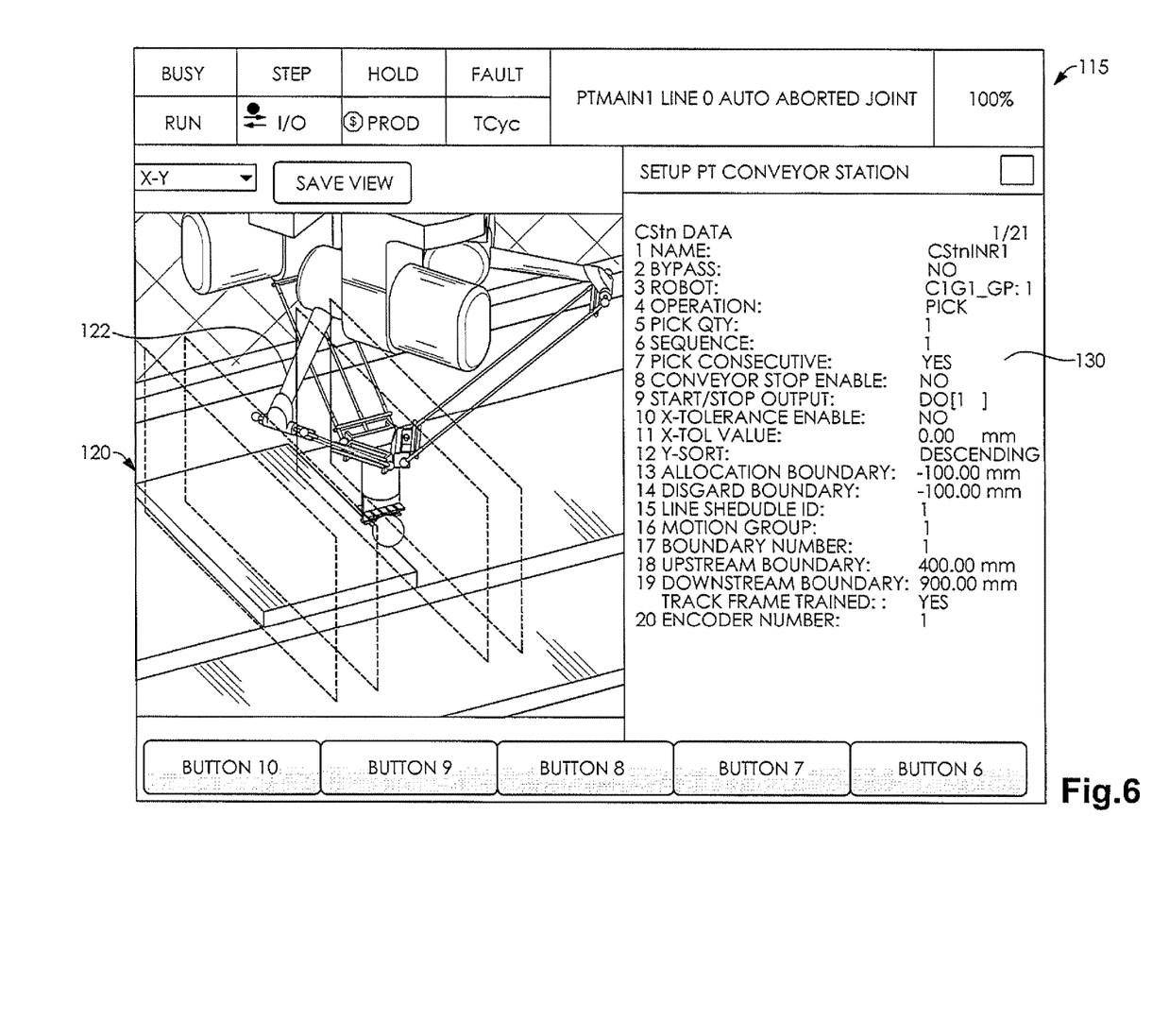

For example, when a user is configuring settings of a particular robot, the display device can provide an automatic zoom and angle change to focus on the portion of the visual output 120 representing the selected robot 122, as shown in FIG. 6. It is understood that any zoom and angle modification technique can be used.

Figure 7:
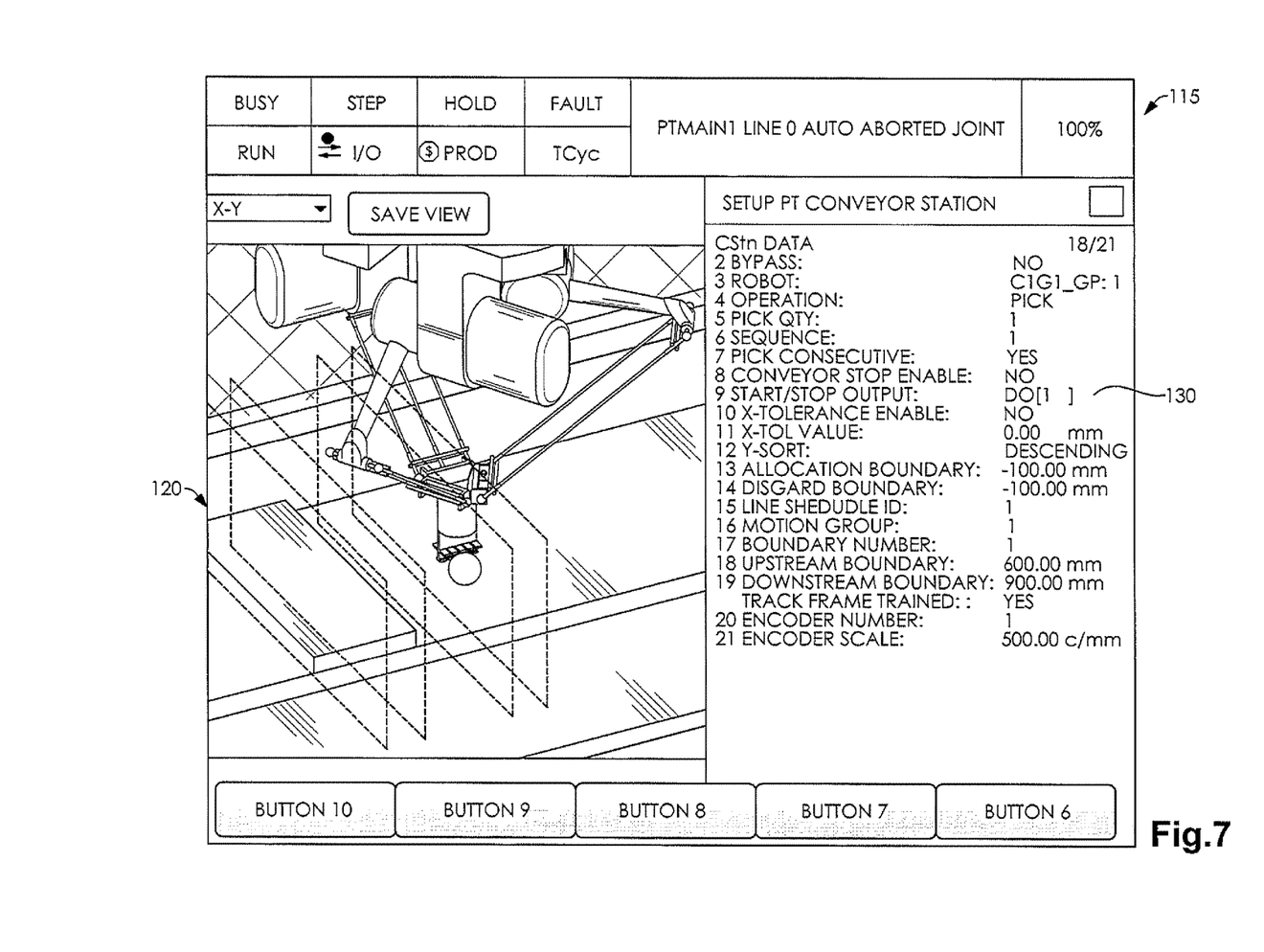

As a further example, the user can interact with the visual output 120 to manipulate a particular setting and to visualize the resultant updates, as shown in FIG. 7.

The system 10 and the method 100 of the present invention avoid the shortcomings of the prior art systems by allowing a handheld device to display and manipulate a three-dimensional rendering of the workcell data. Specifically, once the handheld device (e.g. the display device 14) has a full model of the workcell and associated components the operator can graphically manipulate the programming data in intuitive ways. For example, a virtual safety wall can be selected based on its displayed position in three space relative to other components, as opposed to selecting a position from the conventional list of numbers. An operator can also look at and select a cluster of positions based on a shape and size rather than a name and a table of values. Further, an operator can engage a touch screen of the display device 14 to point to a desired robot position, wherein, after verification, the robot can be guided to the selected position.

Specific processes can also be represented in the three-dimensional rendering of the workcell data. For example, in an arc welding application, an operator can engage the display device 14 to manipulate the three-dimensional rendering of the workcell data to position the virtual torch (e.g. with desirable orientation and angles). Accordingly, the physical torch tool can be controlled to match the virtual rendering set by the operator. It is understood that other applications can benefit from the three-dimensional visual output presented by the system 10 and the method 100.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A system for displaying a three-dimensional robotic workcell data comprising:
   a generator of the robotic workcell data representing at least one of a physical structure of a workcell and a virtual representation of the physical structure of the workcell, the robotic workcell data including a three-dimensional model of a robot and other structure of the workcell, the other structure of the workcell including one of a robot support fixture, a load balance group, a conveyor station, tooling, a virtual wall, a machine workspace, a work piece, and a physical safety fence, and communicating the robotic workcell data in a standard format;
   a display device including a web browser for receiving the robotic workcell data in the standard format from the generator, and displaying a three-dimensional rendering of the robotic workcell data in a visual output, the three-dimensional rendering including the three-dimensional model of the robot and the other structure of the workcell; and
   a manipulator of the three-dimensional rendering of the visual output on the display device, wherein each of the robot and the other structure of the workcell are individually selectable in the three-dimensional rendering by a user with the manipulator to view and configure settings of, and to manipulate the visual output associated with, the three-dimensional model.

2. The system according to claim 1 wherein the display device is one of a teach pendant, a cell phone, a tablet computer and a portable personal computer.

3. The system according to claim 1 wherein the generator is at least one of a robot, a robot controller and an offline programming workstation.

4. The system according to claim 1 wherein the generator generates the robotic workcell data as full three-dimensional data and the three-dimensional rendering is a real-time three-dimensional display.

5. The system according to claim 1 wherein the robotic workcell data further represents at least one of an animated three-dimensional robot model, virtual safety zones, robot interference zones, and a vision setup data.

6. The system according to claim 1, wherein the manipulator permits the user to move and configure visual points of the three-dimensional model in a three-dimensional space, and to rotate, zoom, tilt, and pan a particular view of the three-dimensional model.

7. An apparatus for displaying a three-dimensional robotic workcell data comprising:
   a processor for operating the apparatus;

a display coupled to the processor; and a receiver of a robotic workcell data at the apparatus in a standard format, the robotic workcell data including a three-dimensional model of a robot and other structure of the workcell, the other structure of the workcell including one of a robot support fixture, a load balance group, a conveyor station, tooling, a virtual wall, a machine workspace, a work piece, and a physical safety fence, and for displaying a three-dimensional rendering of the robotic workcell data on the display in a visual output, the three-dimensional rendering including the three-dimensional model of the robot and the other structure of the workcell, wherein the apparatus acts as a client to display the robotic workcell data as the three-dimensional rendering representing at least one of a physical structure of the workcell and a virtual representation of a physical structure of the workcell, wherein each of the robot and the other structure of the workcell are individually selectable in the three-dimensional rendering by a user using the processor to view and configure settings of, and to manipulate the visual output associated with, the three-dimensional model.

8. The apparatus according to claim 7 wherein the display device is one of a teach pendant, a cell phone, a tablet computer and a portable personal computer.

9. The apparatus according to claim 7 including a generator of the robotic workcell data is at least one of a robot, a robot controller and an offline programming workstation.

10. The apparatus according to claim 9 wherein the generator generates the robotic workcell data as full three-dimensional data and the three-dimensional rendering is a real-time three-dimensional display.

11. The apparatus according to claim 7 wherein the robotic workcell data further represents at least one of an animated three-dimensional robot model, virtual safety zones, robot interference zones, and a vision setup data.

12. A method for displaying a three-dimensional robotic workcell data, the method comprising the steps of:

providing the robotic workcell data, robotic workcell data including a three-dimensional model of a robot and other structure of the workcell;

providing a display device including a web browser;

communicating the robotic workcell data to the display device;

displaying a three-dimensional rendering in a visual output with the web browser of the display device, the three-dimensional rendering including the three-dimensional model of the robot and the other structure of the workcell, the other structure of the workcell including one of a robot support fixture, a load balance group, a conveyor station, tooling, a virtual wall, a machine workspace, a work piece, and a physical safety fence, the visual output representing the three-dimensional rendering of the robotic workcell data as at least one of a physical structure of the workcell and a virtual representation of a physical structure of the workcell; and manipulating the visual output, wherein each of the robot and the other structure of the workcell are individually selectable in the three-dimensional rendering by a user with a manipulator to view and configure settings of, and to manipulate the visual output associated with, the three-dimensional model.

13. The method according to claim 12 including providing the robotic workcell data in accordance with an HTML5 specification.

14. The method according to claim 12 wherein the step of communicating the robotic workcell data to the display device includes using at least one of a wired Ethernet, a wireless Ethernet, a Bluetooth protocol, a cellular network, and a wired serial connection.

15. The method according to claim 12 including providing the display device as one of a teach pendant, a cell phone, a tablet computer and a portable personal computer.

16. The method according to claim 12 including providing the robotic workcell data from at least one of a robot, a robot controller and an offline programming workstation.

17. The method according to claim 12 including providing the robotic workcell data as full three-dimensional data and the three-dimensional rendering is a real-time three-dimensional display.

18. The method according to claim 12 wherein the robotic workcell data further represents at least one of an animated three-dimensional robot model, virtual safety zones, robot interference zones, and a vision setup data.

* * * * *